(12) United States Patent
Kim et al.

(10) Patent No.: US 10,140,747 B2
(45) Date of Patent: *Nov. 27, 2018

(54) METHOD AND APPARATUS FOR CONTROLLING PLAYBACK SPEED OF ANIMATION MESSAGE IN MOBILE TERMINAL

(71) Applicant: Samsung Electronics Co., Ltd., Gyeonggi-do (KR)

(72) Inventors: Do-Hyeon Kim, Gyeonggi-do (KR); Won-Suk Chang, Gyeonggi-do (KR); Dong-Hyuk Lee, Seoul (KR); Seong-Taek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,965

(22) Filed: Oct. 31, 2016

(65) Prior Publication Data

US 2017/0046867 A1 Feb. 16, 2017

Related U.S. Application Data

(63) Continuation of application No. 13/658,349, filed on Oct. 23, 2012, now Pat. No. 9,485,346.

(30) Foreign Application Priority Data

Nov. 4, 2011 (KR) ........................ 10-2011-0114264

(51) Int. Cl.
G06T 13/80 (2011.01)
G06T 13/00 (2011.01)
H04M 1/725 (2006.01)

(52) U.S. Cl.
CPC .............. *G06T 13/80* (2013.01); *G06T 13/00* (2013.01); *H04M 1/72544* (2013.01); *H04M 1/72555* (2013.01)

(58) Field of Classification Search
CPC . G06T 13/00–13/80; H04M 1/72544–1/72561
See application file for complete search history.

(56) References Cited

U.S. PATENT DOCUMENTS

| 6,522,333 B1 | 2/2003 | Hatlelid |
|---|---|---|
| 8,054,310 B2 | 11/2011 | Bodin et al. |

(Continued)

FOREIGN PATENT DOCUMENTS

| CN | 1874364 | 12/2006 |
|---|---|---|
| CN | 1921668 | 2/2007 |

(Continued)

OTHER PUBLICATIONS

Chinese Office Action dated Jul. 19, 2016 issued in counterpart application No. 201210436335.9, 15 pages.

(Continued)

*Primary Examiner* — Daniel Hajnik
(74) *Attorney, Agent, or Firm* — The Farrell Law Firm, P.C.

(57) ABSTRACT

A method and apparatus for controlling a playback speed of an animation message in a mobile terminal is provided. The method includes recognizing at least one object to be displayed included in the received animation message; determining the playback speed of the received animation message with respect to each object to be displayed according to the recognized feature of each object; and displaying the animation message according to the determined playback speed.

18 Claims, 5 Drawing Sheets

(56) References Cited

U.S. PATENT DOCUMENTS

| | | | |
|---|---|---|---|
| 2004/0160445 A1 | 8/2004 | Whatmough | |
| 2006/0077206 A1 | 4/2006 | Jaeger | |
| 2006/0209076 A1* | 9/2006 | Maeng | G10L 21/003 345/473 |
| 2006/0276234 A1 | 12/2006 | Kang et al. | |
| 2007/0060193 A1 | 3/2007 | Kim | |
| 2007/0201817 A1* | 8/2007 | Peker | G06F 17/30787 386/329 |
| 2008/0182566 A1 | 7/2008 | Camp, Jr. | |
| 2008/0186385 A1 | 8/2008 | O | |
| 2008/0253735 A1 | 10/2008 | Kuspa et al. | |
| 2009/0167768 A1* | 7/2009 | Bull | G06T 13/00 345/473 |
| 2010/0046911 A1 | 2/2010 | Yachi | |
| 2010/0124400 A1 | 5/2010 | Kim et al. | |
| 2011/0007077 A1 | 1/2011 | Kamath et al. | |

FOREIGN PATENT DOCUMENTS

| | | |
|---|---|---|
| CN | 1984413 | 6/2007 |
| CN | 101290787 | 10/2008 |
| CN | 101622854 | 1/2010 |
| EP | 1 764 985 | 3/2007 |
| KR | 10-0686975 | 2/2007 |
| KR | 1020090073017 | 7/2009 |
| KR | 1020100054421 | 5/2010 |
| KR | 1020100128175 | 12/2010 |
| KR | 1020110061866 | 6/2011 |
| KR | 1020110069984 | 6/2011 |
| WO | WO 2011/129624 | 10/2011 |

OTHER PUBLICATIONS

European Search Report dated Sep. 12, 2016 issued in counterpart application No. 12190812.3-1959, 8 pages.

Chinese Office Action dated Mar. 9, 2017 issued in counterpart application No. 201210436335.9, 14 pages.

Korean Office Action dated May 21, 2018 issued in counterpart application No. 10-2011-0114264, 6 pages.

* cited by examiner

METHOD AND APPARATUS FOR CONTROLLING PLAYBACK SPEED OF ANIMATION MESSAGE IN MOBILE TERMINAL

PRIORITY

This application is a Continuation Application of U.S. patent application Ser. No. 13/658,349, filed in the U.S. Patent and Trademark Office on Oct. 23, 2012, which claims priority under 35 U.S.C. § 119(a) to an application filed in the Korean Industrial Property Office on Nov. 4, 2011 and assigned Serial No. 10-2011-0114264, the entire contents of which are incorporated herein by reference.

BACKGROUND OF THE INVENTION

1. Field of the Invention

The present invention relates generally to a mobile terminal, and more particularly, to a method and apparatus for controlling a playback speed of an animation message in a mobile terminal.

2. Description of the Related Art

A smartphone is a mobile terminal (e.g. a Personal Communication Service (PCS) device and a Personal Digital Assistant (PDA)), and may also provide data communication functions (e.g., schedule management, facsimile communication, Internet, etc.), in addition to functions of a mobile terminal (e.g., a voice call-related functions, etc.). Herein, the term "mobile terminal" refers to any of a variety of devices including traditional mobile terminals as a well as smartphones, for ease of description.

Users may use a mobile terminal to transmit and receive a message that includes a picture or an emoticon (e.g., a Multimedia Messaging Service (MMS) message, a short text message such as an Short Message Service (SMS) message, etc.).

Recently, mobile terminals have also enabled users to create an animation message by adding content including icons, emoticons, figures, character images, etc. and/or by writing a text through handwriting. Mobile terminals can receive and transmit created animation messages, and may display the created animation messages on the mobile terminals.

More specifically, users may create an animation message by writing a textual message on a touch screen with a finger or tools (e.g., a pen, etc.), and by adding icons, emoticons, figures, character images, etc. to the message. When the animation message is created, the mobile terminal may process locations of sampled points on the touch screen, and may store metadata. Subsequently, during the playback of the animation message, a mobile terminal may sequentially display the stored points at regular intervals on a screen. Therefore, users can experience a vivid sensation, as it appears that the animation message is being written by a person while the animation message is played back through an animation message application.

However, when a conventional animation message is played back, many objects input by a user to create content, for example, texts, drawings, figures, handwritten messages, character images, icons, emoticons, and the like, may be displayed in an order that the objects are input or in a random order, as opposed to being simultaneously displayed on the screen. More specifically, frames associated with the objects included in the content may be sequentially or randomly configured and thus, a playback speed of the conventional animation message may be arbitrarily determined, without regard of properties of the content when the animation message is played back.

For example, a conventional method of playing back an object-based animation message may include determining a reference time interval corresponding to a display time per object, calculating a total number of objects included in the animation message, and playing back the objects at the reference time intervals. Another conventional method of playing back a frame-based animation message may include determining a reference time interval corresponding to a display time per frame, calculating a total number of frames included in the animation message, and playing back the frames at the reference time intervals. Another conventional animation message playback method may include determining a reference time interval and a user-preferred speed, and calculating a number of iterations based on the user-preferred speed. The number of iterations may be obtained by dividing the user-preferred speed by the reference time interval. Subsequently, a total number of frames included in the animation message and an amount of data may be calculated. The amount of data may be obtained by dividing the total number of frames by the number of iterations. The frames of the calculated amount of data may be played back at the reference time intervals.

A conventional animation message playback method may display the animation message to a receiver based on a speed at which a sender created the animation message. In this example, the receiver may become bored when the animation message has a large data capacity or includes many objects. When an animation message that includes a large amount of content is displayed at a high speed, in order to quickly check the message. However, such a quick checking may degrade the sense of realism perceived by a user viewing the message played back at a high speed.

SUMMARY OF THE INVENTION

The present invention has been made to address at least the above problems and/or disadvantages and to provide at least the advantages described below. Accordingly, an aspect of the present invention provides a method and apparatus for controlling a playback speed of an animation message in a mobile terminal.

In accordance with an aspect of the present invention, a method of controlling a playback speed of an animation message in a mobile terminal is provided. The method includes recognizing at least one object to be displayed included in the received animation message; determining the playback speed of the received animation message with respect to each object to be displayed according to the recognized feature of each object; and displaying the animation message according to the determined playback speed.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
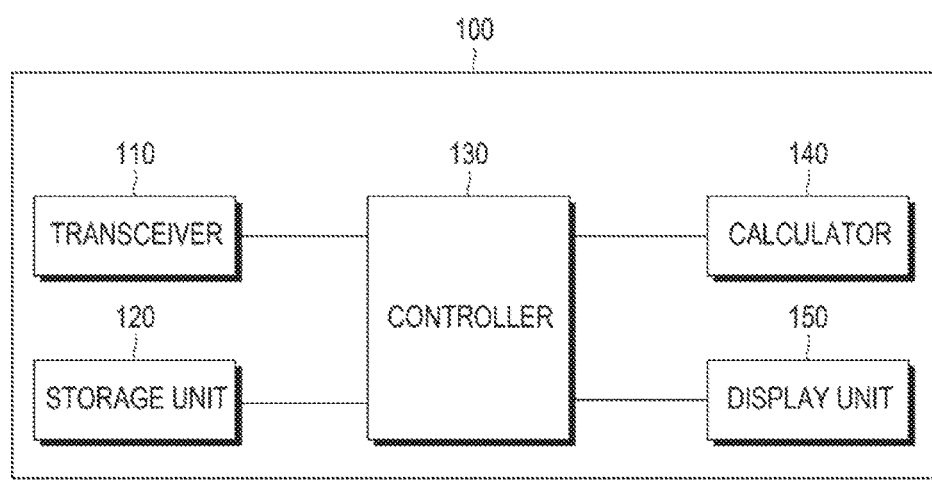
FIG. 1 is a block diagram illustrating an animation message playback speed controlling apparatus of a mobile terminal according to an embodiment of the present invention.

Hereinafter, embodiments of the present invention are described with reference to the accompanying drawings. In the following description, the same elements may be designated by the same reference numerals although they are shown in different drawings. Further, various specific definitions found in the following description are provided to help general understanding of the present invention, and it is apparent to those skilled in the art that the present invention can be implemented without such definitions. Further, in the following description, detailed descriptions of known functions and configurations incorporated herein may be omitted when such a description may obscure the subject matter of the present invention.

FIG. 1 illustrates an animation message playback speed controlling apparatus of a mobile terminal according to an embodiment of the present invention.

Referring to FIG. 1, an animation message playback speed controlling apparatus 100 of a mobile terminal may include a transceiver 110, a controller 130, and a display unit 150. The transceiver 110 may transmit and/or receive an animation message from another mobile terminal. The controller 130 recognizes a feature of an object included in a received animation message and control a playback speed of the animation message according to the recognized feature. The display unit 150 displays the animation message of which the playback speed is controlled.

The animation message playback speed controlling apparatus 100 further includes a calculator 140. The controller 130 also sets a reference time indicating a playback time interval occurring between frames or grouped frames to be played back (hereinafter referred to as a first time), and a user-preferred time indicating a time to be expended for playing back the received animation message (hereinafter referred to as a second time). The received animation message configures a number of frames. The number of frames is grouped into at least one group based on a predetermined unit. The calculator 140 calculates a number of iterations for playing back the received animation message during the set second time.

The animation message playback speed controlling apparatus 100 also includes a storage unit 120 storing a transmitted or received animation message.

The calculator 140 calculates an amount of data based on a number of iterations. The number of iterations is calculated by dividing the second time by the first time. The amount of data may also be calculated by dividing a total number of frames of the received animation message by the number of iterations.

The controller 130 groups all the frames of the received animation message based on a predetermined unit. The controller 130 classifies the frames of the received animation message for each object, and groups, based on a predetermined unit, the frames classified for each object. The controller 130 also controls the playback speed of the animation message so as to play back the grouped frames at regular time intervals. The predetermined unit may vary based on a feature of an object. For example, when the object corresponds to a character input by drawing, a greater number of frames may be grouped in each group than when the object does not correspond to character (e.g., when the object corresponds to a character image, an emoticon, an icon, a figure, etc.).

Herein, a display of each grouped frames is being iterated, and the displayed numbers indicate the number of iterations. The received animation message configures a number of frames. The number of frames is grouped to at least one of group according to their feature, then the received animation message is played back a group unit.

Figure 2:
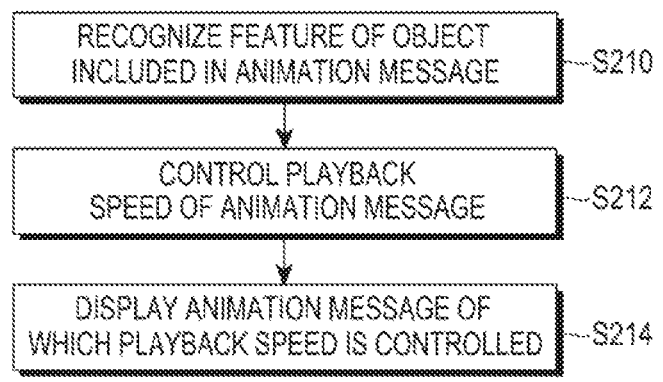
FIG. 2 is a flowchart illustrating an animation message playback speed controlling method of a mobile terminal according to an embodiment of the present invention.

FIG. 2 illustrates an animation message playback speed controlling method of a mobile terminal according to an embodiment of the present invention.

An animation message playback speed controlling method of the mobile terminal according to an embodiment of the present invention is described in detail as follows with reference to FIG. 2.

A mobile terminal may commence playback of an animation message when it is received from another device, such as a mobile terminal, or in response to a request to play back an animation message already stored in the mobile terminal. In step S210, when the mobile terminal commences playback an animation message received from another terminal or stored in advance, the mobile terminal recognizes a feature of an object included in the animation message. The object may include a character, an icon, an emoticon, an image, a figure, etc. The character may include a text input based on a text menu and a drawing created by a user on a touch screen with a finger or a tool (e.g., a pen, etc). The drawing may incorporate characters using points, strokes, etc., and/or an image, such as a picture, etc. A stroke may be a set of points, which may indicate a stroke used for creating a character. The icon, the emoticon, and the image may be newly-created objects drawn by a user or existing objects selected from a menu. The selected or created objects may be displayed by a display unit, for example, a touch screen, and locations of sampled points may be processed and stored as metadata.

When an animation message is received from another terminal, information associated with points of an object is received along with the animation message and thus, a feature of the object may be recognized. The point may be a minimum unit for storing a drawing and/or an image input through a touch screen, and a location of the point on the touch screen may be recognized. For example, when an input character is 'ㄱ', this character 'ㄱ' may be expressed by connecting points within the character, and the locations of these points may be recognized on the touch screen as the character is input by a user. As described in the foregoing, when the object is a character input through drawing, a feature of the object may be recognized through a character recognition function. With respect to a figure, an emoticon, an icon, or a text input through a keypad, information associated with a size or a character code is stored in advance and thus, a feature of an object corresponding to the figure, the emoticon, the icon, or the text input through the keypad may be recognized when a location of the object is recognized on the touch screen.

In step S212, a playback speed at which the animation message is played back is controlled. That is, the playback speed of the entire animation message is controlled by playing back various objects included in the animation message at different playback speeds or by playing back frames grouped together based on a common object. More specifically, since the received animation message includes metadata, the features of objects within the animation message are recognized by analyzing the metadata during the playback of the animation message. For example, an object, such as a character input through drawing, may be recognized as a character, through use of a character recognition function. For example, an object may be recognized when a number of points corresponding to an object is less than or equal to a predetermined number of points. Based on recognized features of objects, playback time intervals between the objects may be determined or different object playback times may be determined for the objects so that the playback speed may be controlled when the animation message is played back on a screen.

In step S214, the animation message, of which the playback speed is controlled, is displayed on the display unit. The animation message is played back in an order that objects are created or in a random order. A method of controlling a playback speed by grouping frames of an animation message according to an embodiment of the present invention is described as follows with reference to FIG. 3.

Figure 3:
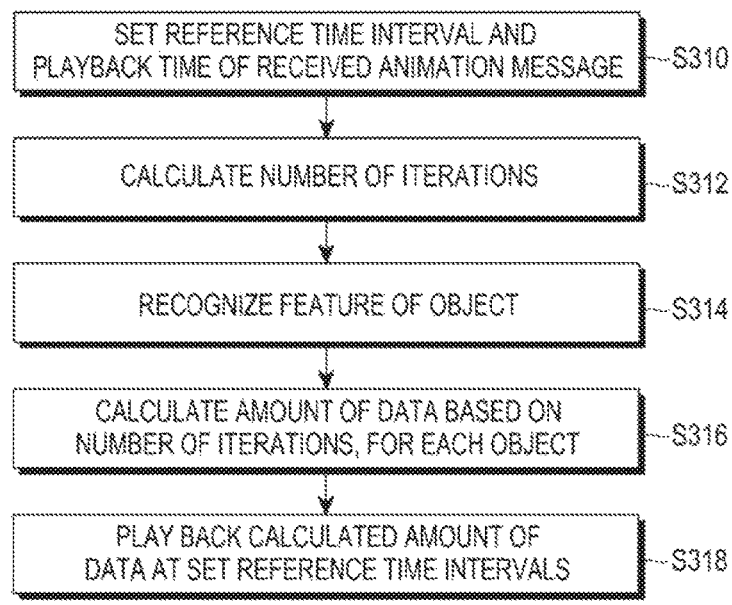
FIG. 3 is a flowchart illustrating a method of controlling a playback speed by grouping frames of an animation message according to embodiment of the present invention.

FIG. 3 illustrates a method of controlling a playback speed by grouping frames of an animation message according to embodiment of the present invention.

Referring to FIG. 3, in step S310, a reference time indicating a playback time interval between frames, which is included in a received animation message, and a total playback time to be expended for playing back the received animation message are set. The reference time also indicates a playback time interval between grouped frames. The total playback time corresponds to a time to be expended for completely playing back the animation message. The reference time and the total playback time may be variable, and may be set based on a receiving user's taste or preference. Grouping may be performed based on a feature of an object, or may be performed based on a predetermined unit irrespective of a feature of an object. Grouping based on a feature of an object is described in further detail herein.

In step S312, a number of iterations associated with the animation message is calculated. The number of iterations may be calculated by dividing the total playback time by the reference time. The number of iterations may indicate a number of groups into which the frames, included in the animation message, are to be divided for playback when the animation message is played back.

In step S314, a feature of at least one object included in the animation message is recognized. The object may include a character input through drawing, a text input through a keypad, an emoticon, an icon, an image, a figure, etc. A feature of the character input through drawing may be recognized through a handwritten character recognition function. For example, a character may be recognized when a number of points in a drawing is less than or equal to a predetermined number. A character input through drawing may include at least one stroke, and may be recognized based on the character recognition function according to the at least one stroke. The character may be composed of a plurality of points. Since a character generally includes fewer points than an image, the character input through drawing may be recognized as a text according to the number of points in the drawing. When a predetermined shape is colored, a great number of points exist and thus, a feature of the object may be recognized. In this manner, when a character or other drawing is created by a user, a determination of whether the object is a character or a drawing may be recognized based on a number of points. A stroke may include a plurality of points, and a character may be recognized based on the stroke corresponding to the plurality of points.

In step S316, an amount of data is calculated for each object based on the number of iterations. The animation message includes at least one object, each of which may be formed of at least one frame. A total number of frames included in the animation message may also be calculated. The amount of data is calculated by dividing the total number of frames by the number of iterations calculated in step S312, and grouping is performed based on the amount of data. The amount of data is determined irrespective of objects included in the animation message, or is determined based on objects included in the message. The determination of the amount of data is described in detail herein with reference to FIGS. 4 and 5.

In step S318, the calculated amount of data is played back at the set reference time intervals. When the object corresponds to a character input through drawing, the amount of data is calculated to include a fewer number of frames than an amount of data calculated when the object corresponds to a non-character (e.g. an image, a figure, an emoticon, etc.).

Figure 4:
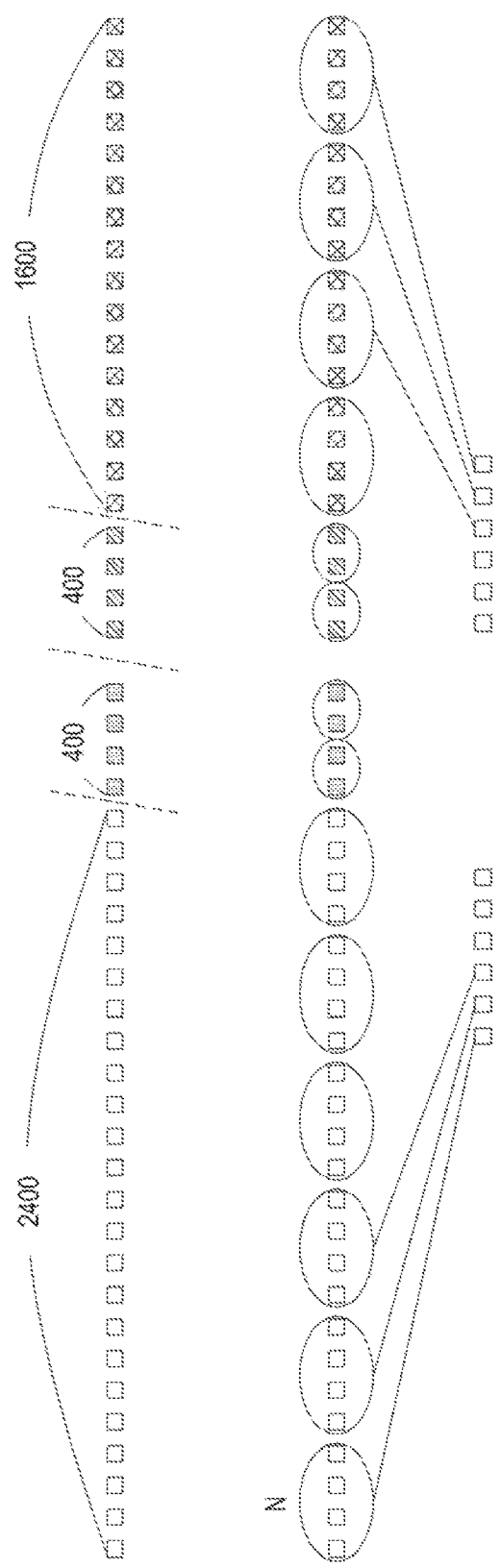
FIG. 4 is a diagram illustrating an example of grouping frames of an animation message based on a user-preferred speed according to an embodiment of the present invention.

FIG. 4 illustrates an example of grouping frames of an animation message based on a user-preferred speed according to an embodiment of the present invention.

Referring to FIG. 4, the animation message includes a plurality of objects. The objects may be drawn by a user, and may include an image object and a character object drawn by a user. Here, points of an object created by drawing may be stored as metadata, and each object may include a plurality of points. Also, a character recognition function recognizes whether an input object is a character or an image created by drawing. Here, it is assumed that images created by drawing include 2400 points or 1600 points each, and characters created by drawing include 400 points each. The objects may have different features, and points of the objects may be grouped by a number of points 'N'. A number of points to be grouped may be variable. When a plurality of objects are included in an animation image including 4800 points, for example, the animation image is divided into 1200 groups by grouping the total number of points into groups, each of which includes four points. For example, as shown in FIG. 4, the total number of points of the image objects may be grouped into groups, each of which includes four points, and the total number of points of the characters may be grouped into groups, each of which includes two points. The number of points to be grouped, according to this particular embodiment of the present invention, is merely provided an example, and the number of points to be grouped may be variable in accordance with embodiments of the present invention. Each group may be played back based on reference time intervals. Accordingly, frames of all the objects included in the animation message may be grouped into groups of four or two frames and thus, animation may be performed 1200 times. The frames may also be grouped according to other processes described herein, but are not limited to such processes. When the frames are grouped, the animation message including the objects may be quickly played back.

Figure 5:
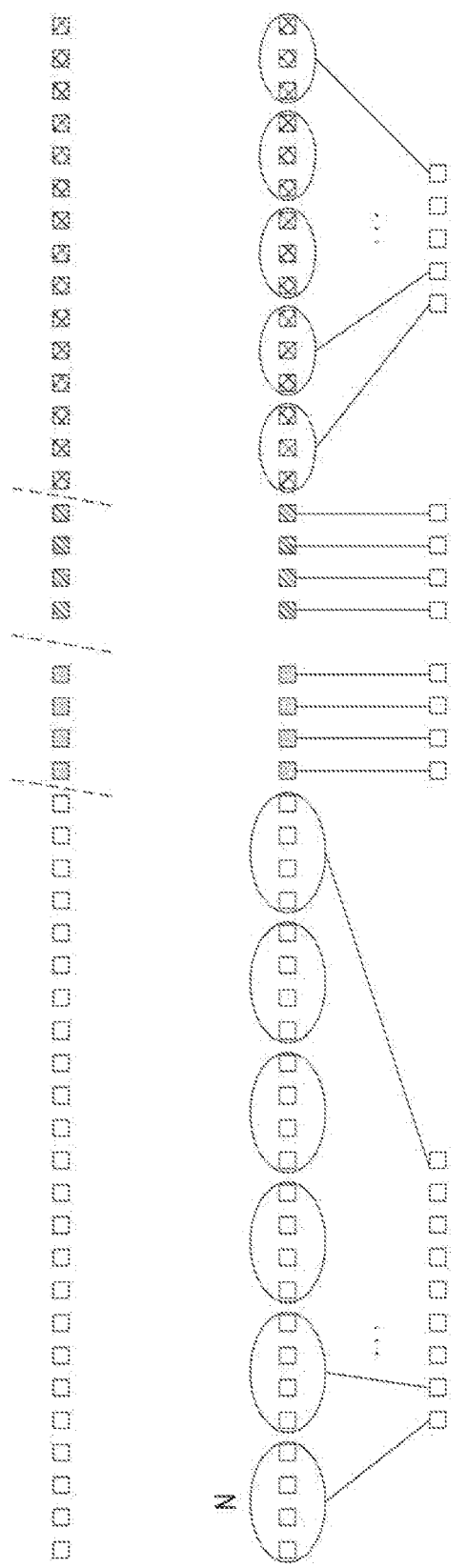
FIG. 5 is a diagram illustrating an example of grouping frames of an animation message based on an object according to embodiment of the present invention.

FIG. 5 illustrates an example of grouping frames of an animation message based on an object according to embodiment of the present invention.

Referring to FIG. 5, the animation message includes a plurality of objects. The objects may be drawn by a user, and may include an image object and a character object drawn by a user. Each object may include a plurality of points, and a character recognition function recognizes whether an input object is a character or a non-character image. The objects may have different features and thus, a time interval for displaying the objects may be controlled so that the objects are played back effectively and vividly to a user. As illustrated in FIG. 5, each object is divided into groups including N points each based on a corresponding feature. A number of points to be grouped may vary based on a display time. For example, a non-character image drawn by a user may be displayed quickly by enabling a greater number of points to be grouped in each group, than a number of points to be grouped together in each group corresponding to a character. In this manner, the display speed is controlled based on a feature of an object so that the animation message is effectively displayed to the user.

Although the descriptions provided in the foregoing with reference to FIGS. 4 and 5 merely describe an animation image formed of objects created by drawing, an animation message according to the embodiments may include an object having different features, such as an icon, an emoticon, an image, a figure, etc. More specifically, the animation message may include graphic objects, such as a figure and/or a text input through a keypad, in addition to characters and images drawn by a user. The graphic object is not necessarily expressed by points, depending on the particular features of the graphic object. In such a case, the graphical object is recognized as a single object and thus, and is displayed based on a different scheme. In order to display such a graphical object having a single figure, at least one frame is required. The number of frames may be decreased in order to reduce a display time of the graphic object, increased in order to increase the display time. In other words, the display time of a graphical object having a single feature is controlled by controlling the number of frames to be used for displaying the single figure. Accordingly, to control a display time of the animation message, points are grouped by N points when an object corresponds to a drawing object, for example, a character or an image created by drawing, and the number of frames are controlled when an object corresponds to a graphic object.

The above-described embodiments of the present invention may be embodied as hardware, software or a combination of hardware and software. Software may be stored in a volatile or non-volatile storage device such as Read Only Memory (ROM) irrespective of erasing or rewriting; a memory such as Random Access Memory (RAM), a memory chip, a memory device, or an Integrated Circuit (IC); a storage medium that is capable of performing optical or magnetic recording and machine-reading such as a Compact Disc (CD), Digital Versatile Disc (DVD), optical disc, magnetic tape, and the like. A memory that may be included in a mobile terminal may be an example of machine-readable storage media that are suitable for storing a program including instructions to implement the embodiments, or programs. Therefore, the invention may include a program including code to implement an apparatus or a method according to an embodiment of the present invention, and/or a machine-readable storage medium including the program, for example, a computer-readable storage medium. The program may be transferred electronically through a medium such as a communication signal transferred through a wired or wireless connection, and the invention may appropriately include an equivalent medium.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of controlling a playback speed of a received animation message in an electronic device, the method comprising:
   receiving, by a transceiver of the electronic device, the animation message;
   recognizing, by a processor of the electronic device, at least two objects to be displayed included in the received animation message;
   classifying, by the processor, the received animation message into a plurality of frames according to each of the recognized at least two objects;
   grouping, by the processor, the classified plurality of frames of each of the recognized at least two objects;
   determining, by the processor, the playback speeds of the at least two objects in the received animation message; and
   displaying, by a display device of the electronic device, the animation message according to the determined playback speeds, wherein the at least two objects are displayed at different playback speeds,
   wherein determining the playback speed of each of the at least two objects further comprises:
   allocating, by the processor, a same playback time to each of the at least two objects, and
   wherein the at least two objects includes a first object being a character and a second object not being a character, and a total number of frames of the first object is different from a total number of frames of the second object.

2. The method of claim 1, further comprising grouping, by the processor, a total number of frames of the received animation message based on a second predetermined number.

3. The method of claim 1, wherein determining, by the processor, the playback speed comprises determining the playback speed such that the grouped frames are played back at regular intervals.

4. The method of claim 1, wherein a first predetermined number varies according to a feature of each of the at least two objects.

5. The method of claim 1, wherein the character includes a plurality of points and at least one stroke, and
   wherein the feature that corresponds to the character is determined through a character recognition function.

6. The method of claim 1, further comprising:
   setting, by the processor, a first time indicating a playback time interval between frames included in the received animation message, and a second time indicating a time to be expended for playing back the received animation message;
   calculating, by the processor, a number of iterations for playing back the received animation message during the set second time; and
   calculating, by the processor, an amount of data based on the number of iterations.

7. The method of claim 6, wherein the number of iterations is obtained by dividing the second time into the first time.

8. The method of claim 6, wherein the amount of data is obtained by dividing a total number of the frames included in the received animation into the number of iterations.

9. An electronic device for controlling a playback speed of an animation message, the electronic device comprising:
a transceiver;
a display unit; and
a processor configured to:
control the transceiver to receive the animation message,
recognize at least two objects to be displayed included in the received animation message,
classify the received animation message into a plurality of frames according to each of the recognized at least two objects,
group the classified plurality of frames of each of the recognized at least two objects,
the playback speeds of the at least two objects in the received animation message, and
display, via the display unit, the animation message according to the determined playback speeds, wherein the at least two objects are displayed at different playback speeds,
wherein the processor is further configured to allocate a same playback time to each of the at least two objects, and
wherein the at least two objects includes a first object being a character and a second object not being a character, and a total number of frames of the first object is different from a total number of frames of the second object.

10. The electronic device of claim 9, wherein the processor is further configured to calculate a number of iterations for playing back the received animation message during a set time indicating a time to be expended for playing back the received animation message.

11. The electronic device of claim 10, wherein the processor is further configured to calculate an amount of data based on the number of iterations.

12. The electronic device of claim 11, wherein the number of iterations is obtained by dividing the set time into a time indicating a playback time interval between frames included in the animation message.

13. The electronic device of claim 11, wherein the amount of data is obtained by dividing a total number of the frames included in the received animation message into the number of iterations.

14. The electronic device of claim 9, wherein the processor is further configured to group the plurality of frames of the received animation message based on a second predetermined unit.

15. The electronic device of claim 9, wherein the processor is further configured to determine the playback speed such that the grouped frames are played back at regular intervals.

16. The electronic device of claim 9, wherein a first predetermined number varies according to a feature of each of the at least two object.

17. The electronic device of claim 9, wherein the character includes a plurality of points at least one stroke, and
wherein the feature that corresponds to the character is determined through a character recognition function.

18. A non-transitory computer-readable recording medium which stores instructions for controlling a playback speed of a received animation message in an electronic device, the method comprising:
receiving, by a transceiver of the electronic device, the animation message;
recognizing, by a processor of the electronic device, at least two objects to be displayed included in the received animation message;
classifying, by the processor, the received animation message into a plurality of frames according to each of the recognized at least two objects;
grouping, by the processor, the classified plurality of frames of each of the recognized at least two objects;
determining, by the processor, the playback speeds of the at least two objects in the received animation message; and
displaying, by a display device of the electronic device, the animation message according to the determined playback speeds, wherein the at least two objects are displayed at different playback speeds,
wherein the processor is further configured to allocate a same playback time to each of the at least two objects, and
wherein the at least two objects includes a first object being a character and a second object not being a character, and a total number of frames of the first object is different from a total number of frames of the second object.

* * * * *